United States Patent Office 3,819,732
Patented June 25, 1974

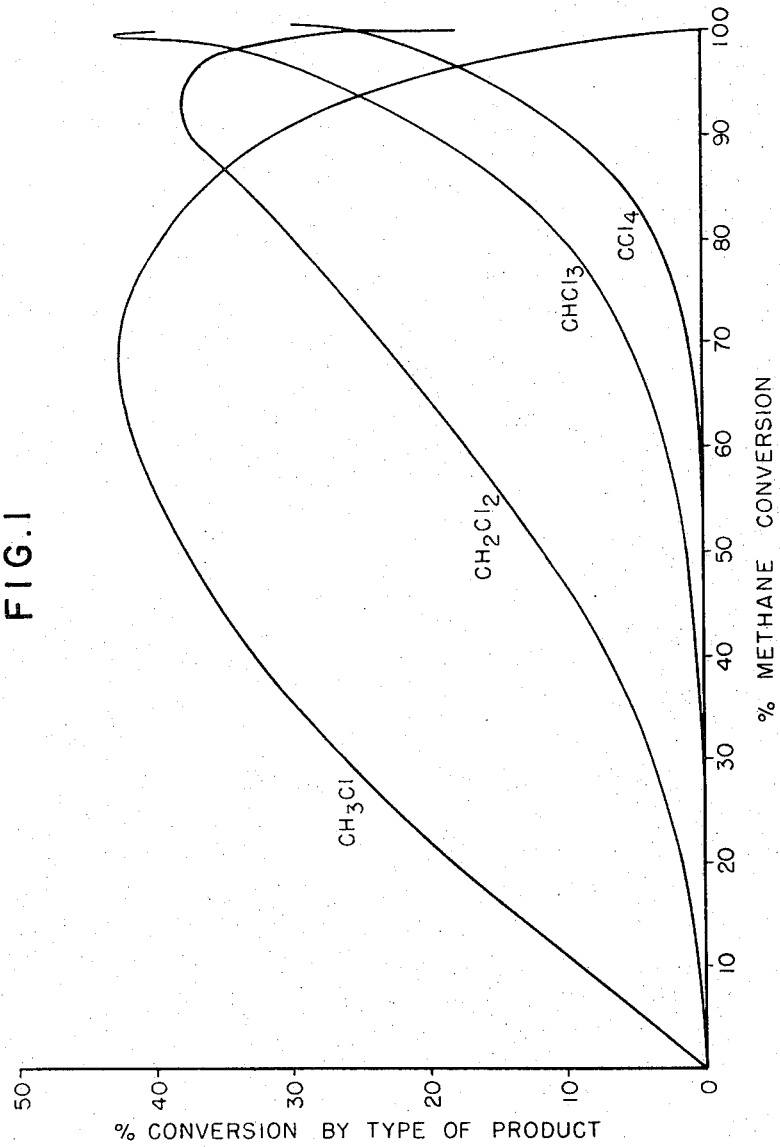

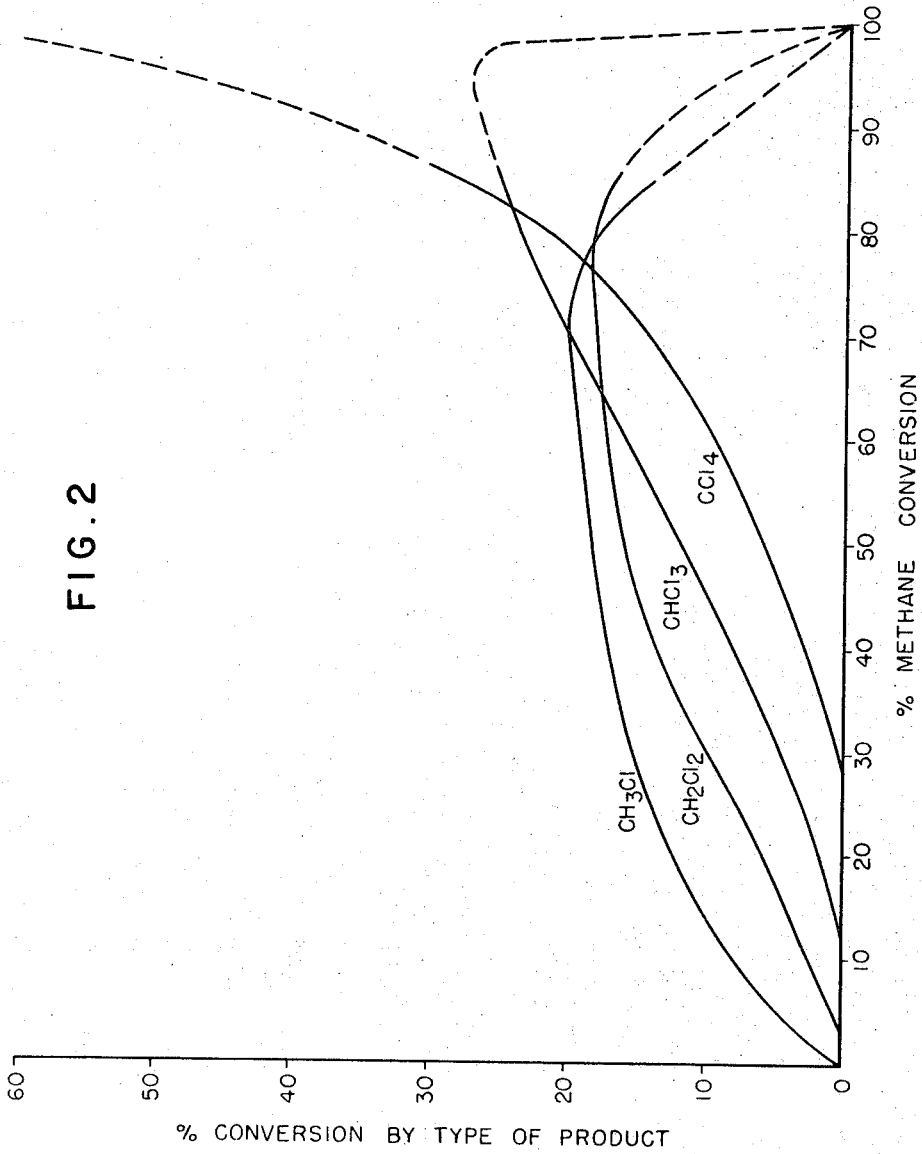

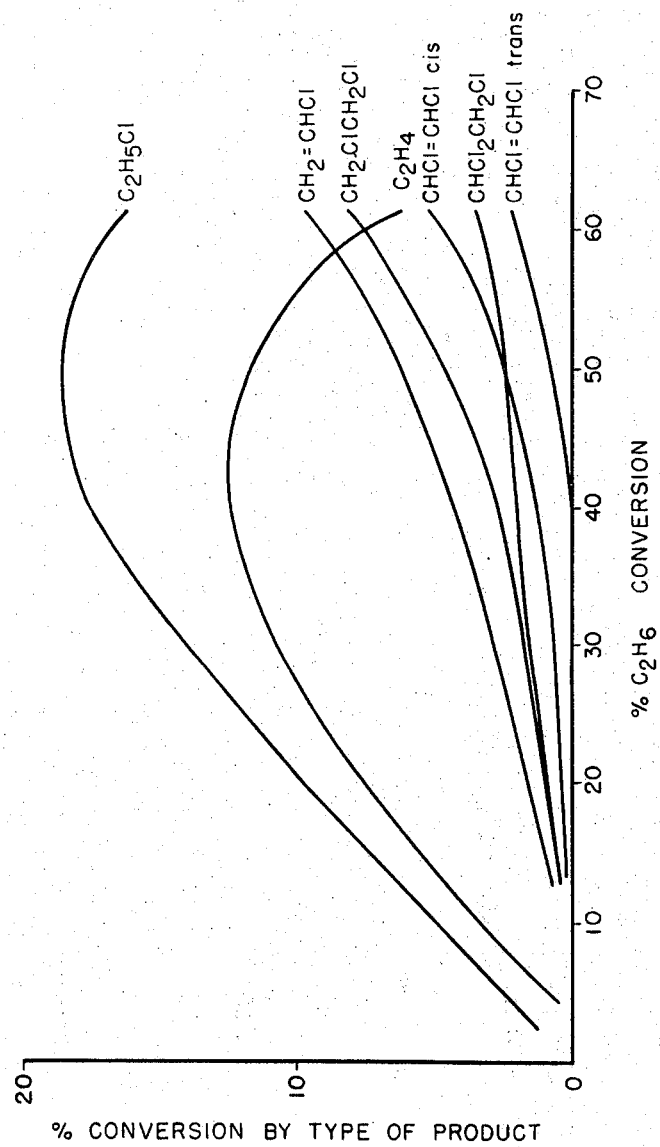

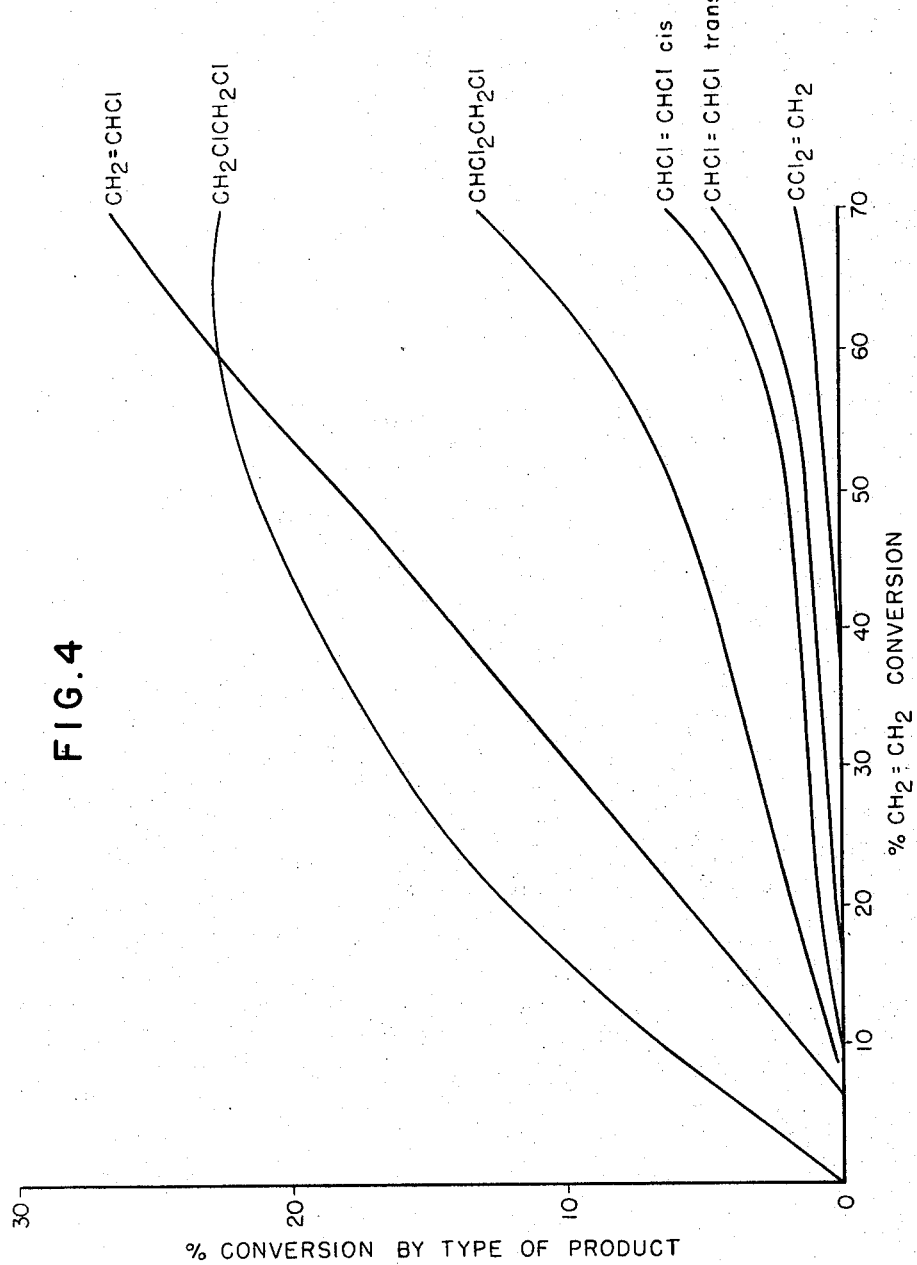

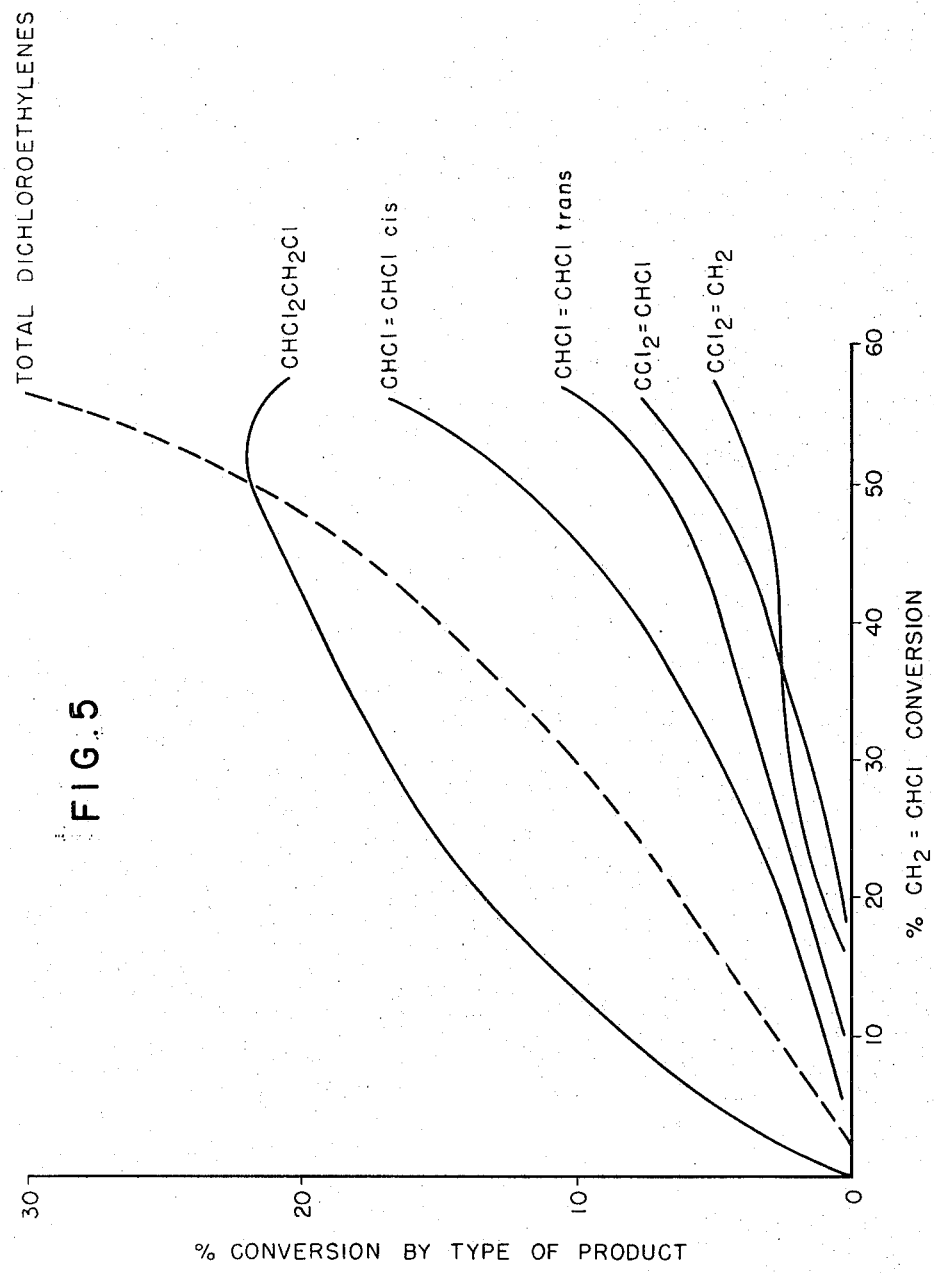

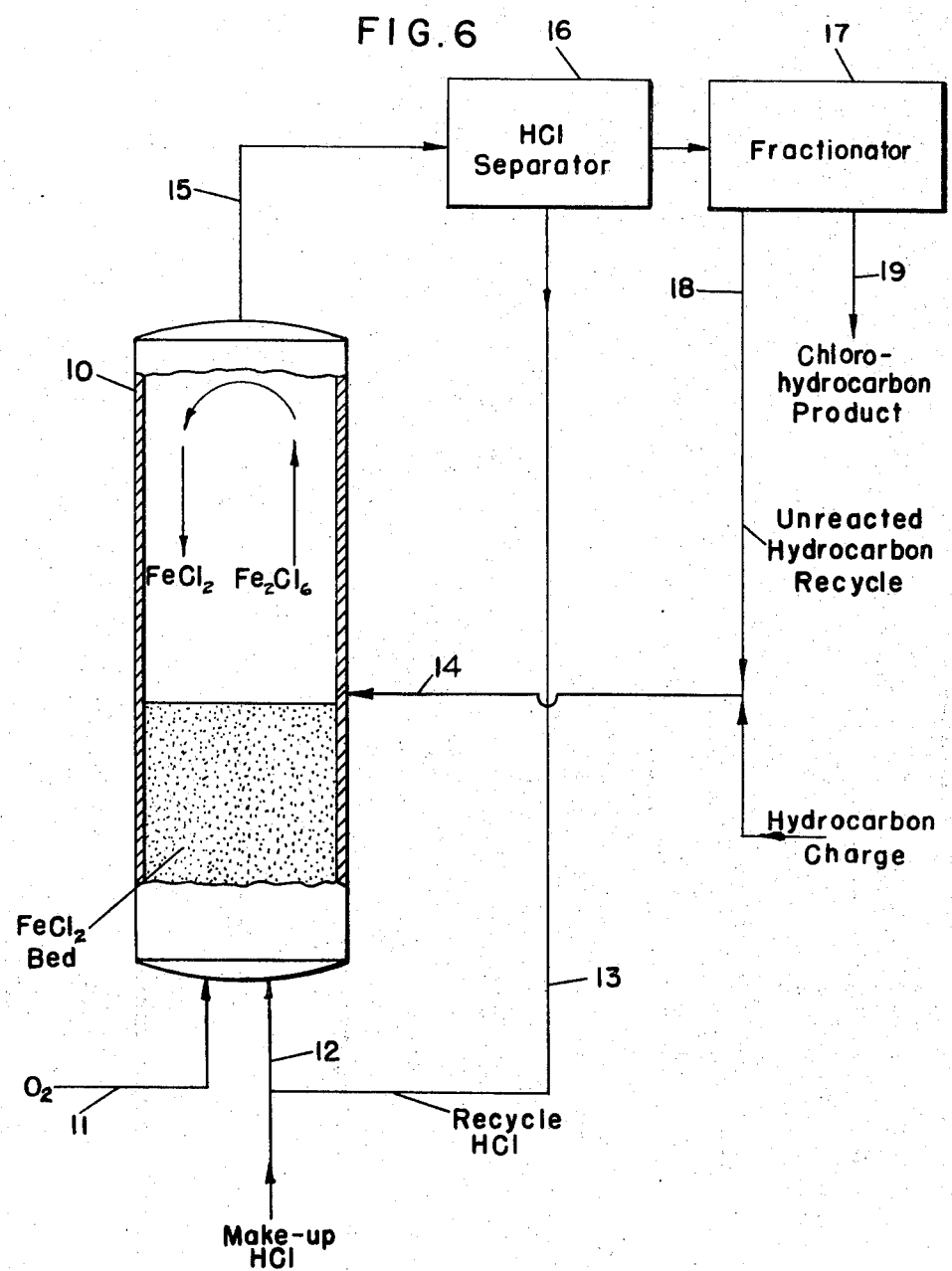

3,819,732
CHLORINATION OF HYDROCARBONS
Walter L. Borkowski and John J. van Venrooy, Media, and Walter H. Seitzer, West Chester, Pa., assignors to Sun Research and Development Co., Philadelphia, Pa.
Original application Jan. 23, 1967, Ser. No. 621,379. Divided and this application Sept. 22, 1969, Ser. No. 859,982
Int. Cl. C07c 17/00
U.S. Cl. 260—659 A                7 Claims

ABSTRACT OF THE DISCLOSURE

Compounds containing hydrogen bonded to carbon are chlorinated in vapor phase when introduced at an intermediate level into a reactor maintained at a temperature in the range of 315–500° C. and containing a bed of ferrous chloride which by interaction with HCl and oxygen is used to produce ferric chloride vapor which is contacted with the C—H containing compound to produce HCl, a C—Cl group, and solid $FeCl_2$ which falls to the bed. When the bed of ferrous chloride gradually converts to oxygenated iron compound, the bed can be periodically regenerated by increasing the proportion of $HCl:O_2$ and continuing to operate at the high $HCl:O_2$ molar proportion until substantially all of the oxygenated iron compound has been converted to iron chloride.

CROSS REFERENCES TO RELATED APPLICATIONS

The present application is a division of Ser. No. 621,379 filed Jan. 23, 1967.

BACKGROUND OF THE INVENTION

Various aspects of the interaction of ferric chloride with hydrocarbons and the production of ferric chloride are disclosed in U.S. Pat. Nos. 3,096,379, 3,131,027, 3,172,915, and 3,184,512.

DESCRIPTION OF THE INVENTION

This invention relates to a process for chlorinating materials containing carbon bonded to hydrogen, by reaction with ferric chloride vapor, which reaction is sometimes hereinafter referred to as ferrichlorination.

Ferric chloride is capable of reacting with hydrocarbons at temperatures above 220° C. to form chlorohydrocarbons and by-product hydrogen chloride. For example, methane can be reacted with $Fe_2Cl_6$ to form all of its chlorohydrocarbon derivatives, namely, methyl chloride, methylene chloride, chloroform, and carbon tetrachloride. Alkanes higher than methane can react to form both saturated and unsaturated chlorohydrocarbons. For example, ethane can be reacted to form practically all of the $C_2$-chlorohydrocarbons such as ethyl chloride, vinyl chloride, dichloroethane, dichloroethylenes, trichloroethane, trichloroethylene, tetrachloroethane, tetrachloroethylene and the like. Cyclic hydrocarbons such as benzene, toluene, xylenes, naphthalene, alkyl naphthalenes and the like and hydrogenated derivatives thereof (e.g. cyclohexanes, cyclohexenes, hydronaphthalenes, etc.) also will react with ferric chloride to yield chloro derivatives. For example, benzene can be reacted to form, at moderate conversion levels, chlorobenzene and dichlorobenzenes (para dichlorobenzene being favored over the meta isomer). Cyclohexane and/or cyclohexene can be reacted to obtain major amounts of benzene and chlorobenzenes as the reaction products, such reactions being analogous to those observed in the ferrichlorination of ethane and/or ethylene, but with the added possibility of aromatization of the substrate.

In the reaction of ferric chloride with hydrocarbons, the iron salt is reduced to the ferrous state. For a commercial operation it is essential to provide means for converting the salt back to ferric chloride for re-use. It is also important to recover the by-product hydrogen chloride from the chlorination product and utilize it in the conversion of the reduced iron salt to the higher valence state.

In the method of the present invention, a feed comprising acyclic hydrocarbon having no more than 6 carbon atoms or cyclic hydrocarbon having no more than 19 carbon atoms is introduced at an intermediate level into a reactor maintained at a temperature in the range of 315–500° C. The feed must be a vapor at the selected reaction temperature and the temperature must be sufficiently high so as to maintain the feed and its chlorinated reaction products in vapor phase.

In the reactor there is a bed of ferrous chloride extending from near the bottom of the reactor to near the level of hydrocarbon introduction and there is a reaction space above the bed through which the feed vapor can flow in an upward direction. Hydrogen chloride and oxygen is constantly fed, either continually or continuously, into the bottom of the bed, in an $HCl:O_2$ molar proportion of at least 4:1 and preferably greater than 4:1 and at sufficient driving pressure to flow upwardly in contact with the ferrous chloride, whereby water is produced and ferrous chloride is constantly converted to gaseous ferric chloride. The range of the HCl and $O_2$ feed and the molar proportion $HCl:O_2$ are chosen such that the build-up of oxygenated iron compounds in the bed is substantially less than can be obtained when the molar proportion of $HCl:O_2$ is less than 4:1.

Upon leaving the bed the gaseous ferric chloride flows upwardly in the reaction space in contact with the hydrocarbon and chlorination of the hydrocarbon occurs with the formation of by-product hydrogen chloride. The ferric chloride is reduced to snow-flake platelets of solid ferrous chloride. The rate of upward gaseous flow is regulated such that the solid ferrous chloride falls downwardly to the bed where it comes in contact with hydrochloric acid and oxygen and is converted to additional gaseous ferric chloride. Chlorinated hydrocarbon, water and hydrogen chloride are withdrawn from the upper part of the reactor along with any remaining unreacted hydrocarbon.

These products are separated, as by fractional condensation and, preferably, the dry HCl and unreacted hydrocarbon are recycled to the reactor.

Thus, the present invention provides a continuous process for chlorinating hydrocarbons by reaction with ferric chloride, i.e., "ferrichlorination." In the process a single reactor is utilized to simultaneously ferrichlorinate the hydrocarbon and convert the resulting ferrous chloride back to ferric chloride which is continuously re-used. An important point of novelty in the process resides in the phenomena whereby the iron chloride reagent continually transforms from solid to vapor and vice versa. Furthermore, since gaseous $Fe_2Cl_6$ is being formed within the $FeCl_2$ bed wherever the reaction is occurring, an inherent temperature control is provided since the heat absorbed by the vaporization of the iron chloride tends to offset the heat released by the exothermic reaction. This helps to avoid the formation of hot spots within the bed. Regulation of $HCl:O_2$ ratio and feed rate or external heat exchange can also be used to control reactor temperatures.

The invention is applicable to the chlorination of any hydrocarbon stock (or chlorinated or fluorinated derivative thereof) which will be in vapor state at the elevated temperatures hereinafter specified for the ferrichlorination reaction, including alkanes, olefins, naphthenes and aromatics. The invention is particularly useful for chlorinating the lower alkanes such as methane, ethane, propane and butanes and for producing chlorinated styrenes, such as beta-chlorostyrene, from $C_8$–$C_{15}$ hydrocarbons having a 6-carbon ring.

According to the invention a single reaction zone maintained at a temperature in the range of 315–500° C., more preferably 350–425° C., and containing a bed of ferrous chloride in its lower part is utilized. A stream of the hydrocarbon to be chlorinated, heated to about the reaction temperature, is fed into the reactor "vapor space" above the top of the ferrous chloride bed. The temperature in this vapor space is in the range of 315–500° C. more preferably below 425° C., and not necessarily at the same temperature as the bed. Into the bottom of the bed oxygen, which can be in the form of air, and hydrogen chloride consisting of the recovered HCl (which should contain as little water as economics will permit) and make-up HCl is continuously introduced.

Contact of these materials with the ferrous chloride causes the following reaction to occur:

(1) 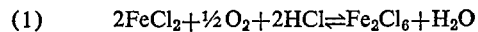

Since the reactor is maintained above the boiling point of ferric chloride (circa 315° C.), the resulting $Fe_2Cl_6$ is in gaseous form. It passes upwardly into the space above the ferrous chloride bed, where it contacts the hydrocarbon feed causing chlorination thereof with the simultaneous formation of solid ferrous chloride. The reaction can be illustrated for the conversion of methane to methyl chloride as follows:

(2) 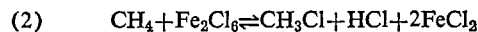

The solid $FeCl_2$, in the form of flat platelets about 1/25 to 1/250 square inch in area, falls out in the vapor space on top of the ferrous chloride bed thus keeping it replenished. The chlorinated hydrocarbon and by-product HCl pass out of the top of the reactor in admixture with unreacted hydrocarbon and, from the bed, with unconsumed HCl and water (and with nitrogen when air has been used as the oxidizing medium). Unreacted $Fe_2Cl_6$ or $O_2$ can also pass from the top of the reactor but we prefer to operate under conditions such that substantially all of the oxygen in the feed is consumed in the bed and substantially all of the $Fe_2Cl_6$, which rises from the bed, is consumed in the vapor space and reconverted to solid $FeCl_2$ "snow." Separators, such as the cyclone type used in fluid bed catalytic crackers, can be used to prevent loss of $FeCl_2$ from the top of the reactor. The HCl is preferably recovered from the reaction product and recycled to the bottom of the reactor along with make-up HCl.

In general, our process can be used for the ferrichlorination of any hydrocarbon which can be chlorinated by chlorine gas in vapor phase at temperatures above about 300° C. However, the rate of reaction of a given hydrocarbon at a given temperature is usually considerably greater when the chlorinating agent consists essentially of $Fe_2Cl_6$ vapor than when $Cl_2$ gas is the chlorinating agent. In fact, at temperatures in the range of 315–500° C. the rate of reaction of $Fe_2Cl_6$ and hydrocarbon vapor is quite fast, some $FeCl_2$ solid forming almost as soon as the $Fe_2Cl_6$ contacts the hydrocarbon vapor.

In the process of the present invention, in the applicable temperature range, the rate of the reaction of $Fe_2Cl_6$ with the feed hydrocarbon is usually faster than the rate at which $Fe_2Cl_6$ can be formed from $FeCl_2$ if the build-up of oxygenated iron compounds is to be avoided. This is in contrast to the process of Borkowski and van Venrooy, Pat. No. 3,562,321, wherein $Fe_2Cl_6$ and $Fe_2O_3$ are formed by reacting oxygen with $FeCl_2$. In that process oxygenated hydrocarbon is prepared by feeding hydrocarbon in vapor phase at an intermediate level into a reactor maintained at a temperature in the range of 315–500° C., said hydrocarbon being a vapor at the selected reaction temperature and the reactor containing, beneath the level of hydrocarbon introduction, a bed of iron compounds comprising a ferrous chloride mass in its upper part and a ferric oxide mass in its lower part. Ferric chloride vapor is flowed into the reactor and reacted with the hydrocarbon above the bed, whereby chlorination of the hydrocarbon occurs with the formation of by-product HCl and the ferric chloride is reduced to solid ferrous chloride which falls downwardly to the bed. Chlorohydrocarbon and HCl are removed from the upper part of the reactor. HCl is recovered from the mixture and introduced into the bed at a level near the top of the ferric oxide mass. Oxygen is passed into the ferric oxide mass beneath the level of introduction of the hydrogen chloride and flows upwardly through the bed in contact with the ferrous chloride whereby the ferrous chloride is continuously converted in part to gaseous ferric chloride and in part to ferric oxide. The ferric oxide, which is continuously forming in the lower level of the bed, is removed from the bottom of the reactor and transported to a hydrolysis vessel where it is contacted with water and the chlorohydrocarbon at a temperature in the range of 100–200° C. whereby the chlorohydrocarbon is hydrolyzed to oxygenated hydrocarbon and the ferric oxide is converted to hydrated ferric chloride. The ferric chloride is dehydrated and recycled to the reactor in an amount substantially equivalent to the ferric oxide which was removed therefrom.

The reaction rate constants for these reactions involving the formation of ferric chloride from ferrous chloride can be readily determined by conventional experimental techniques or can be calculated from thermodynamic data.

The physical laws and experimental techniques which are applicable to the gas phase chlorination of hydrocarbons by means of free chlorine, can be used to determine the rate constants for the ferrichlorination of a particular hydrocarbon. An example of such experimental techniques and also of the method of Martin and Fuchs for calculating the theoretical distribution of chlorinated methane as a function of the degree of conversion of methane are found at pages 688–9 of the Chemistry of Petroleum Derivatives by Carlton Ellis, the Chemical Catalog Co., Inc., New York (1934). The theoretical Martin-Fuchs distribution is shown graphically in FIG. 1. FIG. 2 shows the distribution determined experimentally by a technique similar to that described by Pease and Walz (53 JACS 3728–3737, (1931)). The calculated product distribution will agree much more closely with that obtained by experiment if the Martin-Fuchs calculation is modified to include a correction for relative reaction rates for the series $CH_4$, $CH_3Cl$, $CH_2Cl$, $CHCl_3$. This relation has been reported to be 1:2:1:0.5 by P. R. Johnson, J. L. Parsons, and J. B. Roberts, in I&EC, Vol. 51, 499 (1959). The Martin-Fuchs calculation assumes that there is no back-mixing, which is a very difficult condition to obtain in vapor phase chlorination or ferrichlorination experiments. Therefore, although such calculations can be of considerable aid in initial plant design or for preliminary economic calculations, the exact operating conditions for any desired rate of production of a particular chlorinated hydrocarbon or a group of chlorinated hydrocarbons are best determined by actual operation in a given plant or by scaled-up pilot plant data.

This back-mixing effect on the product distribution for a given degree of hydrocarbon conversion is illustrated in the following table:

TABLE.—BACK-MIXING EFFECT ON PRODUCT DISTRIBUTION

| | Percent product distribution | | |
|---|---|---|---|
| Product | Theoretical [1] (no back-mixing) | Continuous tube reactor (back-mixing moderate) | Spherical batch reactor (back-mixing great) |
| At 22% $CH_4$ conversion: | | | |
| $CH_3Cl$ | 91 | 79 | 60 |
| $CH_2Cl_2$ | 9 | 21 | 29 |
| $CHCl_3$ | | | 11 |
| $CCl_4$ | | | |
| At 45% $CH_4$ conversion: | | | |
| $CH_3Cl$ | 80 | 50 | 36 |
| $CH_2Cl_2$ | 18 | 38 | 32 |
| $CHCl_3$ | 2 | 12 | 24 |
| $CCl_4$ | | | 8 |

[1] Uncorrected Pease and Walz calculation.

The products of ferrichlorination of hydrocarbons differ from those obtainable by vapor phase chlorination with chlorine gas, in that ferrichlorination produces high yields of unsaturated chlorohydrocarbons, if the feed hydrocarbon (or any halogenated derivative thereof) is capable of dehydrochlorination. For example, in the temperature range of 315–500° C. ethane or ethylene can be ferrichlorinated to produce vinyl chloride, trichloroethylene, and tetrachloroethylene.

FIGS. 3 and 4 show the product distribution from the ferrichlorination of ethane and ethylene respectively at 350° C. at moderate back-mixing levels. Similarly, FIG. 5 shows the product distribution when the feed which is ferrichlorinated is vinyl chloride. These curves are representative of the results obtainable with our process, particularly when the reaction temperature in the reactor vapor space is in the range of 350–425° C. For a given temperature, pressure, and reactor volume, such curves can be used in combination with stoichiometric and kinetic calculations to correlate reaction time, rates of reaction, feed and material removal, etc. if the applicable reaction rate constant is known.

The experimental means for determining rate constants for chemical reactions, particularly those in gas phase, are well known. Pease and Walz (ibid.) show a typical experimental method which can be used to study the vapor phase ferrichlorination of methane and other hydrocarbons which are vapors "at the selected reaction temperature." The applicable rate equation, for ferrichlorination of methane, can be expressed as $$\frac{-dPCl_2}{dt} = k_2 pCl_2 \cdot pCH_4$$

that is, for ferrichlorination of methane with gaseous $Fe_2Cl_6$, $$\text{Rate} = \frac{-dp Fe_2Cl_6}{dt} = k [pFe_2Cl_6][pCH_4]$$

where $k$ is the rate constant, $pFe_2Cl_6$ is the partial pressure of ferric chloride, and $pCH_4$ is the partial pressure of methane.

The experimental value for $k$ is 0.59 per mole per second at 350° C.

In addition, Pease and Walz show how to experimentally determine a temperature coefficient which can be used to determine the reaction rate at any given temperature (within the appropriate temperature range). In the case of the ferrichlorination of methane to methylchloride, in the temperature range from 300–350° C., this coefficient is 1.6 per 10° C.

The invention is described more specifically in conjunction with FIG. 6 of the accompanying drawings, which is a schematic illustration of the ferrichlorination process.

With reference to the drawing, 10 illustrates the reactor which contains a bed of ferrous chloride in its lower part. The temperature throughout the reactor is maintained in the range of 315–500° C., more preferably 350–425° C. Higher reaction temperatures in the specified range tend to increase the degree of chlorination effected in the process. Oxygen (air) is introduced into the bottom of the reactor through line 11 and HCl consisting of make-up HCl and by-product HCl from line 13 is introduced through line 12. Heated hydrocarbon charge is fed into the reactor above the $FeCl_2$ bed via line 14. Reaction of the oxygen and HCl with the $FeCl_2$ causes the formation of gaseous $Fe_2Cl_6$ and steam (water) which pass upwardly into the vapor space where the $Fe_2Cl_6$ reacts with the hydrocarbon and hence is reduced to $FeCl_2$. Fluffy translucent, yellow-tinted or "off-white," solid particles of $FeCl_2$ are formed and these fall downwardly (like snow flakes) and become a part of the bed. There is thus a continuous flow of gaseous $Fe_2Cl_6$ upwardly from the bed and a continuous return of solid $FeCl_2$ to it.

The rates of introduction of oxygen and hydrogen chloride into the bottom of reactor 10 are regulated to provide the required proportion of $Fe_2Cl_6$ to hydrocarbon for the desired chlorination reaction and also so as to eliminate or substantially reduce the build-up of oxygenated iron compounds in the bed. These rates will vary depending upon the particular hydrocarbon being charged and the degree of chlorination desired. An excess of the hydrocarbon over the stoichiometric amount required for the desired reaction generally should be used and the hydrocarbon-$Fe_2Cl_6$ mean contact time should be long enough to cause substantially all of the $Fe_2Cl_6$ to react so that no unreacted $Fe_2Cl_6$ will remain in the reaction product, as otherwise depletion of the $FeCl_2$ bed will occur and $Fe_2Cl_6$ will have to be recoverd from the reaction product.

As can be seen from Equation (1) supra, the stoichiometrically required molar proportion of HCl to $O_2$ introduced into the reactor is 4:1. However, an excess of HCl over this proportion should be used in order to suppress the build-up of oxygenated iron compounds in the bed.

The reaction product, in vapor phase, flows from the top of the reactor through line 15 to a separator 16 for removing the HCl. Any conventional or suitable procedure for separating HCl from hydrocarbons or hydrocarbon derivatives can be used. For example, the procedure described in *Chem. and Eng. Progress*, December 1960, pages 67–73 can be employed. This involves contacting the HCl-containing mixture with a 20% aqueous solution of HCl and stripping absorbed HCl from the rich absorption medium. Water which is present in the reaction mixture as a result of the reaction shown by Equation (1) supra will also be absorbed by the absorption medium. In order to prevent the build-up of water in the HCl absorption system, a drag stream of the lean absorption medium can be sent to another distillation zone to separate the appropriate amount of water from aqueous HCl and the latter can be returned to the stream of lean absorption medium. The recovered HCl is recycled through line 13 to the base of the ferrichlorinator 10.

The HCl-free material from separator 16 passes to a fractionator 17 where unreacted hydrocarbon is separated from the chlorohydrocarbon product. Nitrogen can also be separately removed if air has been used as the source of oxygen in the process. The unreacted hydrocarbon is recycled through lines 18 and 14 to the reactor and the chlorohydrocarbon product is withdrawn from the system as indicated by line 19.

Recycled HCl should be as free of water as economics will permit. Preferably, the molar ratio of HCl to water in the feed to the bed should not be less than 10:1. Conventional methods for preparing dry HCl from aqueous HCl can be used, such as those discussed at page 666 of Kirk-Othmer, *Encyclopedia of Chemical Technology*, vol. 7 (1st ed., 1951). Wet HCl can also be dried in conjunction with the Hargreaves process (see p. 657, *Ibid.*). For example, the wet HCl can be contacted with $SO_2$, the HCl separated by distillation and the remaining aqueous $SO_2$ reacted with oxygen and NaCl to make additional HCl. Another method which can be used to prepare very dry HCl is by the use of adsorbants, such such as those molecular sieves which have a pore size sufficiently large to adsorb water but not large enough to adsorb HCl.

The ferrous chloride bed can be either relatively compacted (such as if the reactor is in the nature of a rotary kiln) or can be kept in a moderately expanded or "ebullated" condition (see U.S. 2,987,465 and Canadian Pat. 451,379). At very high concentrations of $Fe_2Cl_6$, the $FeCl_2$ formed in the vapor space of the reactor is in the form of finely divided crystals; however, the usual appearance of the $FeCl_2$ particles formed in the present process can be described as like snow-flakes, except that the FeCl₂ flakes do not have the detailed geometric patterned structure of snow-flakes, but are more like flake mica. When there is no gas flowing through the bed, bulk density of the FeCl₂ in the bed can be from 0.09 gm./cc. to 0.3 gm./cc., and with mechanical compaction the density can be from 0.5 to 1 gm./cc. In order to obtain a large rate of production of Fe₂Cl₆ vapor from a relatively small volume of FeCl₂ bed, we prefer to adjust the molar ratio of HCl:O₂ and the total gas flow through the bed such as to maintain the mass of particular solids in an expanded state of at least 10% greater volume than the settled state of the mass but below a velocity to carry over solids from the bed to the upper ferrichlorination area.

The rate of upward gas flow through the bed and the rate of hydrocarbon introduction above the bed must be both regulated such that the total rate of upward gaseous flow does not prevent the solid ferrous chloride (formed during the ferrichlorination of the hydrocarbon) from falling downwardly to the bed. For initial calculations one may use the usual engineering approximation (see U.S. 3,086,852) that the fluidization velocity of a particle is approximately 1/20 of its free fall velocity; however, the sizes and shapes of the FeCl₂ particles in the bed will be influenced by the HCl:O₂ ratio, the total gas flow through the bed, and the bed dimensions (due to attrition, etc.). Therefore, the relationship between total gas flow through the bed and total upward gas flow in the ferrichlorination zone must ultimately be determined by experiment.

Flow rates and the temperatures of feeds into the reactor can be adjusted such that a fairly uniform temperature is maintained throughout the entire reactor. However, our process can be operated such that there is an appreciable temperature difference, say, 100° C., between the bed and the ferrichlorination zone, such temperature relationships being primarily a matter of engineering preference.

As is further disclosed hereinafter, in one embodiment of our invention the bed of ferrous chloride is allowed to gradually convert to oxygenated iron compound, and the bed is periodically regenerated by increasing the molar proportion of HCl:O₂ and continuing to operate at said higher HCl:O₂ molar proportion until substantially all of the oxygenated iron compound has been converted to iron chloride. During such regeneration, the temperature in the bed is preferably below 330° C. and can be below the vaporization temperature of ferric chloride (e.g., 150–190° C.). In particular the regeneration conditions can be as shown in U.S. 2,723,902.

Our method can operate either at atmospheric, or superatmospheric pressure. For economical large scale operation, we prefer to operate at a maximum pressure in the reactor in the range of 25–200 p.s.i.g. because it is presently less costly to construct a reactor with design pressures within this range than it is to construct the correspondingly larger reactor which would be required for operation at about 1 atmosphere. Although subatmospheric pressure operation is not precluded, we do not find that it has any advantages. Operation at pressures above 200 p.s.i.g. is not precluded so long as the Fe₂Cl₆, the feeds used and the corresponding chlorinated products thereof, can remain in vapor phase; however, operation at such high pressures is not presently warranted because of the high cost of constructing reactors designed to withstand such pressures. Similarly, in order to conserve reactor space, we would prefer to use relatively pure oxygen rather than air in our feed; however, the HCl:O₂ feed can be diluted with as much as 10 volumes of a carrier gas such as helium, nitrogen or CO₂.

It is well known that oxygen greatly inhibits the chlorination of gaseous hydrocarbons by chlorine gas (e.g., see the article by Pease and Walz, 53 JACS 3728–3737 (1931)). Surprisingly, we have found that the effect of oxygen as an inhibitor of ferrichlorination of gaseous hydrocarbons with Fe₂Cl₆ vapor is not nearly as severe as with chlorination using chlorine gas. Therefore, so long as explosive hydrocarbon-oxygen mixtures are avoided our process can be operated at conditions such that there is less than complete consumption of feed oxygen in the FeCl₂ bed. However, we prefer operation wherein the bed size, temperature, pressure, HCl:O₂ molar proportion and the rate of HCl and O₂ feed are chosen such that at least 80% of the O₂ in the feed is consumed in the bed and more preferably at least 99% of the O₂ in the HCl:O₂ feed is consumed in the FeCl₂ bed, since such a high consumption of oxygen in the bed reduces the production of oxygenated hydrocarbons and/or CO₂ in the ferrichlorination zone.

It should be noted that below 400° C. there is negligible dissociation of Fe₂Cl₆ to FeCl₃ and that the reaction $2FeCl_3 \rightleftharpoons 2FeCl_2 + Cl_2$ requires temperatures greater than 750° C. as is reported in *Mellor's Modern Inorganic Chemistry*, Revised Ed., Longmans, Green & Co., Inc., New York, 1951, p. 862. It is also reported by H. Schafer and E. Oehler, *Zeit. fur Anorg. Chem.*, 271, 206–216 (1953), that in the temperature range of 333–676° C., the equilibrium pressures for the system $$Fe_2Cl_6(g) \rightleftharpoons 2FeCl_2(s) + Cl_2$$

are expressed by the relationship, $$\log \frac{pCl_2}{pFe_2Cl_6} = \frac{2,147}{T} - 4.862$$

where T is the temperature in ° K. That is, in this range even at equilibrium the concentration of gaseous Fe₂Cl₆ will be much greater than that of Cl₂; therefore, the chlorination reagent consists essentially of ferric chloride vapor.

As has been noted herein, the reaction of HCl, O₂ and FeCl₂ of the present process, i.e., $$FeCl_2 + HCl + O_2 \rightleftharpoons Fe_2Cl_6 + H_2O$$

occurs at a much slower rate than the reaction $$FeCl_2 + \tfrac{1}{4} O_2 \rightleftharpoons \tfrac{1}{6} Fe_2O_3 + \tfrac{1}{3} Fe_2Cl_6$$

In each of these reactions, it is quite probable that FeOCl is formed as an intermediate product. When HCl and oxygen in a molar ratio of less than 4:1 are fed into a bed of FeCl₂ at a temperature in the range of 315–500° C., appreciable amounts of FeOCl, which is a solid, are produced; therefore, one may look at the various methods for the production of ferric chloride which are disclosed in U.S. 3,131,027 and U.S. 3,562,321 as involving first the reaction of FeCl₂ and oxygen to form FeOCl and then the reaction of FeOCl with either HCl to form Fe₂Cl₆ and water or, if the HCl concentration is too low, the decomposition of FeOCl into Fe₂Cl₆ gas and solid Fe₂O₃.

If one wishes to avoid or to minimize the production of Fe₂O₃, the molar proportion of HCl to O₂ in the feed to the bed should be greater than 4:1. Even when so operating, at an HCl:O₂ molar proportion of greater than 4:1, it is possible for oxygenated iron compound (FeOCl and/or Fe₂O₃) to build up in the bed; however, if such build-up occurs it will be substantially less than can be obtained when the molar proportion of HCl:O₂ is less than 4:1. Such build-up can be avoided by choosing the rate of HCl:O₂ feed and the molar proportion of HCl:O₂ such that the net consumption of oxygen and HCl in the bed is substantially in the molar proportion of 4:1, and/or that there is a net production of about 2 moles of water for each mole of oxygen that is consumed in the bed. We also prefer to operate at a temperature in the reactor (or at least in the bed) of from 350–425° C., since in this temperature range, at HCl:O₂ ratios above 4:1, the reaction of FeOCl with HCl to form ferric chloride can be effected much more rapidly than the competitive decomposition to $Fe_2O_3$. In order to substantially prevent the build-up of oxygenated iron compounds, we also prefer to feed hydrogen chloride and oxygen into near the bottom of the bed, at a volume space velocity of from 1–6 volumes of gas/volume of $FeCl_2$/hr., in an $HCl:O_2$ molar proportion of at least 6:1 and more preferably from 8:1 to 25:1.

Although, for simplicity, the ideal operation of our process is under conditions such that oxygenated iron compounds do not build up in the bed, such operation is not necessarily the most economical at all feed rates and at all degrees of hydrocarbon conversion. For flexibility, a plant can be designed to operate under ideal conditions and also with a view toward operating under less than ideal conditions, where build-up of oxygenated iron compounds can occur, by incorporating into the plant design means for the removal of such oxygenated iron compounds (particularly $Fe_2O_3$), and means for the addition of make-up $FeCl_2$ or $Fe_2Cl_3$.

For example, a valve and line can be incorporated at the bottom of the reactor shown in FIG. 6 from which oxygenated iron compound can be removed and a feed line can be added above the level of the $FeCl_2$ bed through which make-up $FeCl_2$ or $Fe_2Cl_6$ vapor can be added if oxygenated iron compounds is withdrawn from the reactor. Such a reactor is similar to that shown in the previously mentioned Pat. No. 3,562,321, except that, in addition to $O_2$, HCl is fed into the bottom of the reactor.

It can also be economical to combine operation of the present process with that shown in Pat. No. 3,562,321. That is, HCl and $O_2$ are fed into the reactor near the bottom of the $FeCl_2$ bed in an HCl to $O_2$ molar proportion of at least 4:1 but at temperature and feed rates such that $Fe_2O_3$ is formed. Due to the nature of the reaction, if $Fe_2O_3$ is produced it will be mainly segregated below the level of the $FeCl_2$; however, if some $Fe_2O_3$ forms in admixture with $FeCl_2$ (such as when net oxygen consumption in the bed is below about 80%) it will segregate to the bottom of the reactor because $Fe_2O_3$ is of smaller particle size and has a density much greater than the $FeCl_2$ or FeOCl. The $Fe_2O_3$ which so builds up at the bottom of the reactor is withdrawn and transported to a hydrolysis reactor where it is contacted with chlorinated hydrocarbon in order to produce oxygenated hydrocarbon and hydrated $Fe_2Cl_6$. The hydrated $Fe_2Cl_6$ can be passed to a dehydrator and the resulting dry $Fe_2Cl_6$ can be passed back to the reactor, preferably in vapor form.

One advantage of this process is that it allows for flexibility in that the net production can be either oxygenated hydrocarbon or chlorinated hydrocarbon or a combination thereof. Another advantage of such a combined operation is that the hot HCl which is removed from the top of the reactor can be used to dehydrate the hydrated $Fe_2Cl_6$. The steam-HCl mixture from the reactor can be so used, directly; however, if the HCl is eventually recycled to the reactor substantially all of the water must be removed, as by the previously mentioned means.

In one embodiment of our invention, the bed of ferrous chloride is allowed to gradually convert to oxygenated iron compound, and the bed is periodically regenerated by increasing the molar proportion of $HCl:O_2$ and continuing to operate at this higher $HCl:O_2$ molar proportion until substantially all of the oxygenated iron compound has been converted to iron chloride. In this method the $HCl:O_2$ ratio can be made infinite by feeding no $O_2$ into the reactor. We prefer that such regeneration be effected by adjusting the $HCl:O_2$ feed to greater than 25:1.

When the oxygenated iron compound contains an appreciable amount of ferric oxide, such regeneration of the $FeCl_2$ bed can be effected at the temperatures and feed conditions shown in U.S. 2,723,902. We prefer to operate our process under conditions such that the oxygenated iron compound which builds up in the reactor is FeOCl, since the reaction of HCl and FeOCl to produce $Fe_2Cl_6$ and water (see U.S. 3,131,027) can be effected more rapidly with substantially anhydrous HCl at temperatures above 100° C. than can the conversion of $Fe_2O_3$.

The following examples are presented as a further aid in understanding the present invention. Example I illustrates the pilot plant scale production of methyl chloride under conditions such that more than 99% of the oxygen which is fed to the bed is consumed in the bed and converted to water. Example II illustrates plant scale production of methyl chloride and methylene chloride at superatmospheric pressure.

EXAMPLE I 57.5 moles per hour of oxygen and 500 moles per hour of HCl are passed into the bottom of a cylindrical reactor which is maintained at 350° C. and atmospheric pressure by regulating the temperature and pressure of the inlet gases. The total volume contained by the reactor is 2200 liters, the bottom 1400 liters being occupied by a bed of $FeCl_2$ flakes, and the upper portion of the reactor, containing 800 liters of vapor space, is surrounded by a steam jacket. Above the bed methane is introduced at a rate of 1150 moles per hour. The temperature of the outlet gas is maintained at 350° C. by regulation of the temperature of the methane feed and by heat exchange with the jacketed steam. 115 moles per hour of methyl chloride are recovered from the reaction product which is withdrawn, as a vapor, from the top of the reactor along with the unreacted methane, a minor amount of dichloromethane, 115 moles per hour of steam, and 385 moles per hour of HCl.

EXAMPLE II

The reactor is an Inconel-lined cylindrical reactor having a diameter of 11 feet and being 20 feet in height and is designed to withstand 75 p.s.i.g. and 750° F. The bottom of the reactor contains a line and valve to allow removal of $FeCl_2$ or oxygenated iron compounds. Above the catalyst drain are lines and nozzles to allow the entry of hydrogen chloride and oxygen into the bottom of the reactor. The bottom section of the reactor contains a bed of $FeCl_2$ of 10 feet in depth. Above the level of the bed is a line to allow the entry of feed hydrocarbon and at the top section of the reactor are cyclone separators and a vent for withdrawing reaction product. 30,920 lbs./hr. of HCl and 1695 lbs./hr. of oxygen are passed into the bottom of the reactor and flow upward through the bed which is maintained, by heat exchange, and control of feed temperatures, at 450° F. Above the bed 7015 lbs./hr. of methane (1565 lbs./hr. of which is fresh feed and the remainder recycle) are flowed upward through the vapor space which is maintained, by heat exchange and control of feed temperatures, at 350° F. and 50 p.s.i.g. 7325 lbs./hr. of reaction product, as vapor, are withdrawn from the top of the reactor and separated into 3550 lbs./hr. of methyl chloride, 1520 lbs./hr. of methylene chloride, 1920 lbs./hr. of water vapor (which is removed in a drying system) and 26,860 lbs./hr. of HCl which is recycled along with 4060 lbs./hr. of fresh HCl to the bottom of the reactor. The $HCl:O_2$ ratio is periodically adjusted by the plant operators so as to prevent substantial build-up of oxygenated iron compounds.

The above-described process is applicable to the ferrichlorination of any compound containing hydrogen bonded to carbon and which is a vapor at the selected reaction temperature, within the range of 315–500° C., and whose chlorination products can be maintained in vapor phase at such temperature level. If a minor amount of the reaction product is not in vapor phase at the reaction temperature, the process can be operated in a continual manner whereby coke is allowed to build up in the $FeCl_2$ bed, and when such tar build-up becomes objectionable, regenerating the bed, as by purging the reactor of hydrocarbon, oxidizing the coke, thereby also producing some oxygenated iron compound, and then reconverting said oxygenated iron compound to $FeCl_2$ or $Fe_2Cl_6$, as by the means previously referred to herein. The process can also be operated by continually adding fresh $FeCl_2$ at the top of the bed and continually removing iron compound and coke from the bottom of the reactor.

It is possible to obtain some coke when the feed to the reactor comprises acyclic hydrocarbon having more than 6 carbon atoms because at temperatures in the range of 315–500° C., in the presence of $Fe_2Cl_6$ vapor steam and HCl, some cracking of such acyclic hydrocarbons can occur. Similarly, coke can form when the feed comprises cyclic hydrocarbon having more than 19 carbon atoms. The preferred feeds in our process are selected from the following substances (and mixtures thereof):

(1) benzene, naphthalene, anthracene, phenanthrene, diphenylethane, and hydrogenated derivatives thereof (e.g., cyclohexane, cyclopentane, cyclopentadiene, cyclohexene, hydronaphthalenes, cyclohexylphenylethanes, hydroanthracene, and hydrophenanthrenes, etc.);

(2) alkyl substituted cyclic hydrocarbons wherein the cyclic nucleus is selected from the group (1) and attached thereto are 1–3 alkyl groups each of which has not more than 3 carbon atoms (e.g., see U.S. 3,219,711);

(3) vinyl substituted derivatives of the members of groups (1) and (2) (e.g., styrene, vinylnaphthalene, vinylcyclohexane);

(4) acyclic hydrocarbons having from 1–6 carbon atoms (e.g., methane, ethane, propane, butanes, pentanes, hexanes, ethylene, propylene, butenes, butadiene, pentenes, hexenes, acetylene, etc.); and (5) partially chlorinated or fluorinated derivatives of any of the members of the preceding classes.

Partially chlorinated derivatives of any of the hydrocarbons which can be fed to our process are themselves suitable feeds for our process (as illustrated herein by FIG. 5). Once chlorination of any given hydrocarbon begins its resulting chlorinated products are further reacted upon by the $Fe_2Cl_6$; therefore, chlorinated derivatives of the feed hydrocarbons are considered to be equivalents thereof in the present patent application.

We claim:

1. Method of chlorinating a hydrocarbon which comprises simultaneously (a) feeding hydrocarbon in vapor phase at an intermediate level into a reactor maintained at a temperature in the range of 315–500° C., said hydrocarbon and its chlorination reaction products being a vapor at the selected reaction temperature and said reactor containing a bed of ferrous chloride extending from the bottom thereof to near the level of hydrocarbon introduction and having a reaction space above the bed, (b) flowing the hydrocarbon vapor upwardly in said reaction space, (c) feeding hydrogen chloride and oxygen into the bottom of said bed in an $HCl:O_2$ molar proportion of at least 4:1 and flowing the same upwardly in contact with the ferrous chloride, whereby ferrous chloride is continuously converted to gaseous ferric chloride, and wherein the bed of ferrous chloride gradually converts to oxygenated iron compound, (d) flowing the gaseous ferric chloride upwardly in said reaction space in contact with the hydrocarbon, whereby chlorination of the hydrocarbon occurs with the formation of by-product hydrogen chloride and the ferric chloride is reduced to solid ferrous chloride which falls downwardly to said bed and (e) withdrawing chlorinated hydrocarbon and by-product hydrogen chloride from the upper part of said reactor; and (f) periodically regenerating said bed at a temperature below 330° C. by increasing said proportion of $HCl:O_2$ to from 8:1 to 25:1 and continuing to operate at said increased molar proportion until substantially all said oxygenated iron compound has been converted to iron chloride.

2. Method according to Claim 1 in which:
    the hydrocarbon feed comprises acyclic hydrocarbon having no more than 6 carbon atoms or cyclic hydrocarbon having no more than 19 carbon atoms.

3. Method according to Claim 2 wherein the temperature in said bed is in the range of 150–190° C. during said periodic regeneration.

4. Method according to Claim 1 wherein the temperature in said bed during said regeneration is below the vaporization temperature of ferric chloride.

5. Method according to Claim 1 wherein the volume space rate of gas flow through said bed is increased during said regeneration.

6. Method according to Claim 2 wherein said hydrocarbon comprises methane, ethane, propane, ethylene, propylene, or mixtures thereof.

7. Method according to Claim 2 wherein said hydrocarbon comprises methane, ethane, propane, ethylene, propylene or mixtures thereof and wherein said oxygenated iron compound in step (c) comprises $Fe_2O_3$.

References Cited

UNITED STATES PATENTS

| | | | |
|---|---|---|---|
| 3,184,512 | 5/1965 | Blair | 260—659 A X |
| 3,172,915 | 3/1965 | Borkowski et al. | 260—659 A X |
| 3,131,027 | 4/1964 | Borkowski et al. | 23—154 |
| 2,723,902 | 11/1955 | Reeve et al. | 23—87 R |
| 3,562,321 | 2/1971 | Borkowski et al. | 260—533 |

FOREIGN PATENTS

| | | | |
|---|---|---|---|
| 664,117 | 5/1963 | Canada | 260—659 A |
| 686,794 | 5/1964 | Canada | 260—659 A |
| 517,009 | 9/1955 | Canada | 260—659 A |

LEON ZITVER, Primary Examiner

J. A. BOSKA, Assistant Examiner

U.S. Cl. X.R.

260—648 R, C, 649 R, 650 R, 651 R, 654 A, 655, 656 R